Nov. 7, 1967 R. ORTEGA 3,351,237
MEASURED-QUANTITY INTERMITTENT-ACTION DISPENSER
FOR A PARTICULATE MATERIAL
Filed Feb. 28, 1966 2 Sheets-Sheet 1

INVENTOR.
ROBERT ORTEGA

Nov. 7, 1967 R. ORTEGA 3,351,237
MEASURED-QUANTITY INTERMITTENT-ACTION DISPENSER
FOR A PARTICULATE MATERIAL
Filed Feb. 28, 1966 2 Sheets-Sheet 2
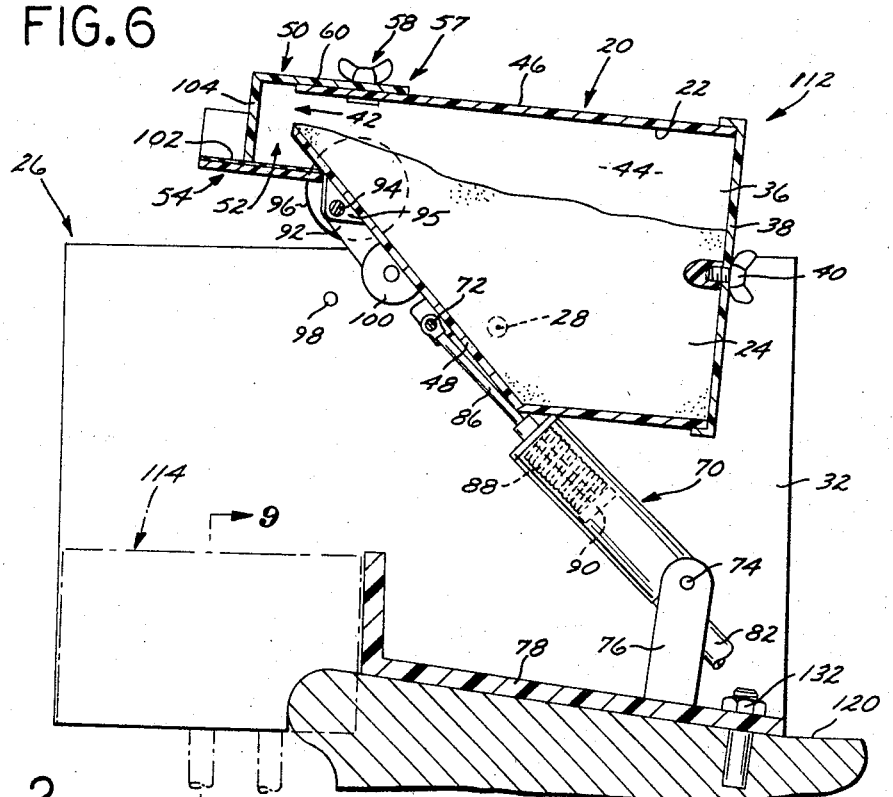
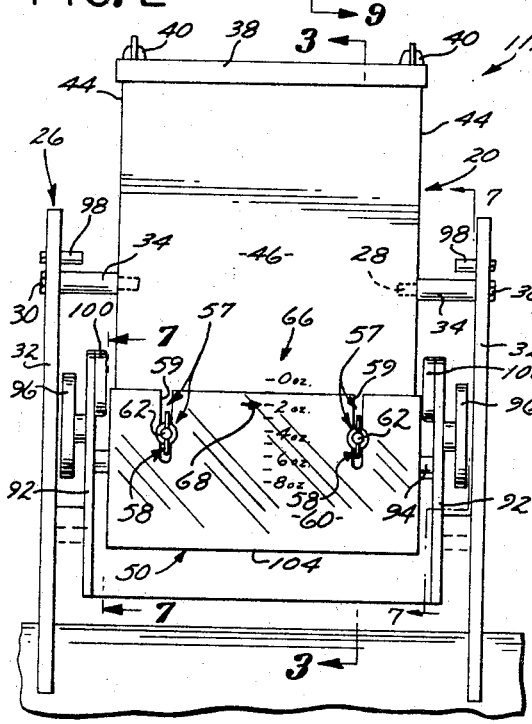
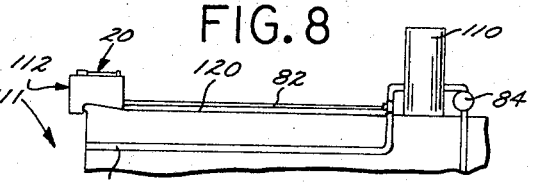
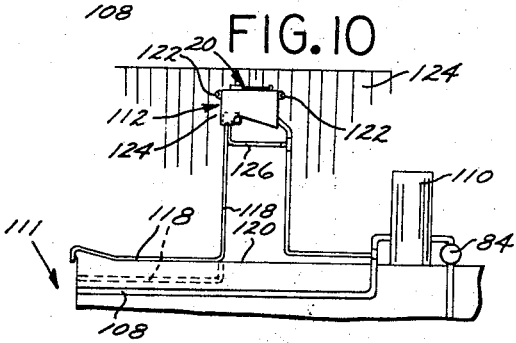
INVENTOR.
ROBERT ORTEGA

United States Patent Office 3,351,237
Patented Nov. 7, 1967

3,351,237
MEASURED-QUANTITY INTERMITTENT-ACTION DISPENSER FOR A PARTICULATE MATERIAL
Robert Ortega, Los Angeles, Calif.
(4171 Calhoun Drive, Huntington Harbour, Calif.)
Filed Feb. 28, 1966, Ser. No. 530,280
17 Claims. (Cl. 222—23)

Generally speaking, the present invention relates to the dispensing art and, more particularly, to a dispenser of an intermittent-action, or batch-dispensing, type which in any particular dispensing action dispenses a measured quantity of a particulate material.

One particularly advantageous embodiment of the invention is where it effectively comprises a chlorinator for a body of water, such as a body of swimming pool water, or the like, and wherein the particulate material referred to generically above takes the form of a dry chlorine powder which may be directly dispensed in a measured quantity into the large body of water contained within a swimming pool or which may be indirectly fed thereinto by way of an intervening or intermediate direct dispensing of a measured quantity of a dry chlorine powder into a quantity of solvent water, usually carried in a solution container means positioned under the dispenser and provided with outflow means for feeding the concentrated chlorine solution, produced by the dissolving of the dry chlorine powder in the solution container means, into a larger body of water such as that contained within a swimming pool.

The outflow feeding of the concentrated chlorine solution just referred to may be entirely under the action of gravity in certain forms of the invention and may be accomplished by way of an underground concentrated chlorine solution tubing or pipe, of non-corrodible material, extending from the solution container means into the interior of the swimming pool or, in a simpler installation, may be by way of a concentrated chlorine solution tubing, which merely lies across the top surface of the flat deck portion customarily surrounding a swimming pool and extends downwardly over the edge thereof in the interior of the swimming pool. These are merely certain exemplary embodiments of the invention and it should be clearly understood that the invention is not specifically limited to the particular exemplary forms just referred to, but, broadly speaking, may be employed whereever a particulate material is to be fed, in a measured quantity, into a desired receiving region and where the intermittent operation of the dispenser is accomplished by the operation of an actuator means (usually initiated by a fluid pressure change in fluid pressure input duct means coupled to the actuator means, although not specifically so limited in all forms of the invention).

It should be noted that the high-pressure side of a conventional main swimming pool hydraulic circuit—that is, the portion of said hydraulic circuit between a motor-driven main swimming pool pump and the outlet of the return line feeding filtered water back into the swimming pool, may be employed for providing the desired pressure change in the fluid input to the actuator means referred to above since, in such an arrangement, it will be understood that whenever the main swimming pool pump is operating and high pressure is produced thereby, the actuator will be actuated into one extreme position and will cause operation of the dispenser means in one manner and into one condition, in which condition it will remain until the main swimming pool pump is de-activated, such as usually occurs under the control of a time clock-operated switch means at night and during other periods of non-use of a swimming pool, at which time the pressure fed to the actuator means from the high pressure side of the pump will drop and the actuator means will be operated into the opposite or initial condition, which will, of course, cause operation of the dispenser in the opposite manner to that referred to above and into the opposite or initial condition thereof.

One such operation of the dispenser means (usually the return operation to the normal or initial condition thereof) primes or loads a measuring container means portion of the dispenser with a desired quantity of the dry chlorine powder, but does not dispense same. However, the next succeeding (and oppositely directed) operation of the dispenser means by the actuator means does cause the dispensing of said measured quantity of dry chlorine powder into the desired region, such as the water within the swimming pool or the solution container, as previously referred to.

Thus, it will be seen that the above-mentioned embodiment of the present invention, wherein it effectively comprises a chlorinator for a swimming pool, is particularly advantageous since it provides a very simple structure operable, in response to activation and de-activation of the main swimming pool pump, to feed directly into the main swimming pool water, or into a solution tank of water which is fed directly thereinto, a measured quantity of dry chlorine powder whereby to produce an optimum condition of the swimming pool water and to do so in relatively inexpensive and maintenance-free apparatus and in apparatus which has virtually no tendency to clog in the undesirable manner of certain prior art dry chlorine dispensers. This is so because of the substantial agitating action and the sealed nature of the improved form of the novel chlorine dispenser embodiment of the present invention, as will be detailed hereinafter.

With the above points in mind, it is an object of the present invention to produce a novel measured-quantity, intermittent-action, dispenser for particulate material of the character referred to herein generically and/or specifically and which may include any or all of the features referred to herein, either individually or in combination, and which is of extremely simple, inexpensive, maintenance-free, and virtually clog-proof construction which is adapted for mass manufacture at a very low cost-per-unit and is adapted for use with pre-existing swimming pools and as original equipment provided in association with a swimming pool at the time that it is constructed, whereby to be conducive to widespread manufacture, distribution, and use of the invention.

Further objects are implicit in the detailed description which follows hereinafter (which is to be considered as exemplary of, but not specifically limiting, the present invention), and said objects will be apparent to persons skilled in the art after a careful study of the detailed description which follows.

For the purpose of clarifying the nature of the present invention, two exemplary embodiments of the invention are illustrated in the hereinbelow-described figures of the accompanying two sheets of drawings and are described in detail hereinafter.

FIG. 2 is an elevational view of the apparatus of FIG. 1 as seen from the left side of FIG. 1, which actually comprises a front elevational view of the apparatus as seen from the swimming pool side thereof. Also, it should be noted that FIG. 2 is drawn to a somewhat larger scale than FIG. 1.

FIG. 4 is a fragmentary cross-sectional view taken substantially along the plane indicated by the arrows 4—4 of FIG. 3.

Figure 1:
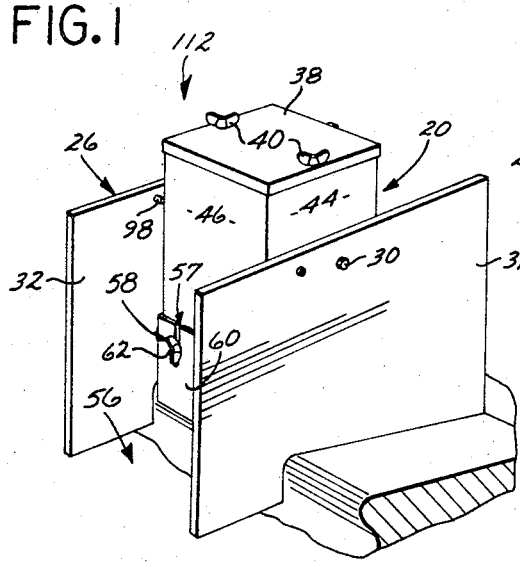
FIG. 1 is a reduce-size, exterior, three dimensional, pictorial view of one exemplary embodiment of the present invention wherein it comprises a swimming pool chlorinator for directly dispensing a measured quantity of dry chlorine powder into a larger body of water adapted to be contained within a swimming pool, a fragmentary edge portion of which is shown in FIG. 1.
Figure 5:
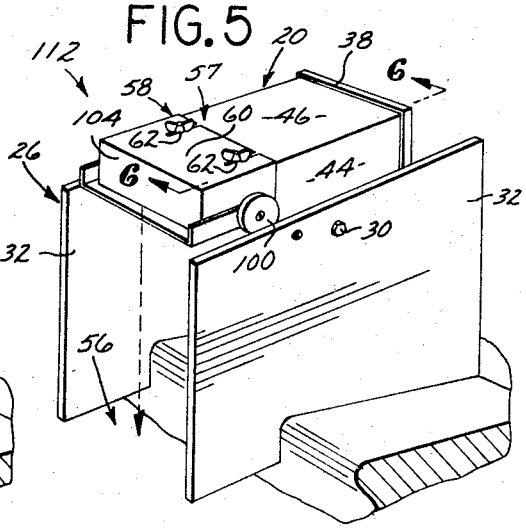

FIG. 5 is a view similar to FIG. 1, but for the first time shows the apparatus of FIGS. 1–4 after the actuator means has been operated or actuated as a result of the application of high pressure to the input duct means thereof whereby to bring about rotative movement of the hopper means of the dispenser from the first upright or normal position of FIGS. 1–4 to the second, and rotatably displaced, position of FIG. 5 wherein it is substantially horizontally positioned (which shall also be construed to means a position slightly inclined below a true horizontal position).

Figure 3:
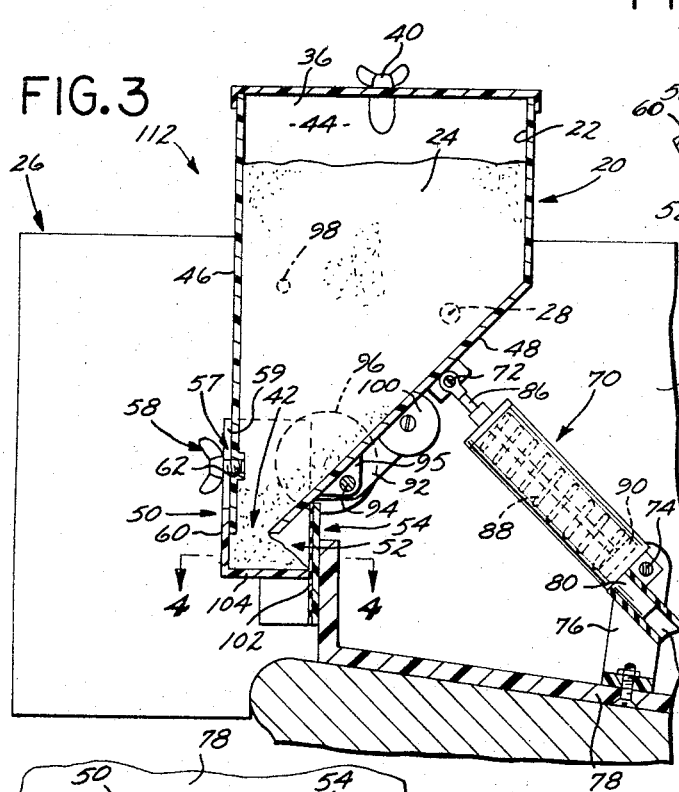
FIG. 3 is a view, partly in elevation and partly in vertical section, taken substantially along the plane indicated by the arrows 3—3 of FIG. 2.

FIG. 6 is an enlarged view, partly in elevation and partly in section, taken substantially along the plane indicated by the arrows 6—6 of FIG. 5 and in many ways is similar to FIG. 3 with the exception of the fact that the actuator is shown in the actuated, fully-extended position in FIG. 6 and the hopper means is shown in the second, and rotatively displaced, substantially horizontal position of FIG. 5.

FIG. 7 is a sectional view taken along section lines 7—7 of FIG. 2, and showing the hopper rotated into an intermediate position between the upright position shown in FIG. 3 and the substantially horizontal position shown in FIG. 6, at which intermediate position the gate is opened.

FIG. 8 is a greatly-reduced-size, fragmentary, and somewhat diagrammatic view illustrating a portion of a hydraulic swimming pool circuit with the first form of the invention of FIGS. 1–7 in cooperative relationship with respect thereto for directly chlorinating the main swimming pool water by discharging of a measured quantity of dry chlorine powder directly thereinto.

Figure 9:
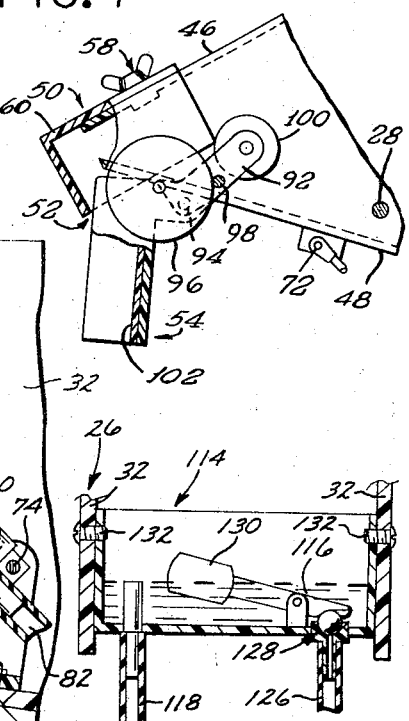

FIG. 9 is a fragmentary sectional view of a solution container employed in an alternate modified form of the invention, the position of which in said modified form is indicated in phantom in FIG. 6, and this view is taken substantially on the plane indicated by the arrows 9—9 of FIG. 6—it of course being realized that said plane 9—9 applies to the corresponding plane of the modified form of the invention employing said solution container rather than to the first form of the invention shown in full or solid lines in FIG. 6, which does not employ said solution container means.

FIG. 10 is a greatly-reduced-size, fragmentary, and somewhat diagrammatic view similar to FIG. 8 but illustrating the modified form of the invention shown fragmentarily in section in FIG. 9 and in phantom in FIG. 6.

The exemplary first form of the invention illustrated in FIGS. 1–8 may be said to comprise a supply hopper means, such as is generally indicated at 20, having a hollow interior chamber 22 defined therein and adapted to contain therein a quantity of particulate material 24 which, in one preferred exemplary embodiment of the invention, may comprise dry chlorine powder, although the invention is not limited to the dispensing of such dry chlorine powder.

The hopper means 20 may be rotatably mounted by a supporting framework means, generally designated at 26, by having a pair of stub shafts 28 fastened as indicated at 30 to upstanding laterally spaced side wall portions 32 of said framework means 26. Spacers 34 may be positioned on the stub shafts 28 to properly center the hopper means 20 between the side wall portions 32.

Said stub shafts 28 are horizontally aligned and may be said to define a substantially horizontally directed first axis of rotation which is the only axis of rotation of the hopper means 20 relative to the framework means 26 and which allows the hopper means 20 to be rotated from its normal first position, which is shown as comprising an upright position in FIGS. 1–3, into a second position, which is shown in FIGS. 5 and 6 as comprising a substantially horizontally directed position (which is also intended to mean a slightly-below-horizontal inclined position, as is clearly shown in said FIGS. 5 and 6).

The hopper means 20 has an upper filling opening 36 which is provided with a removable cover means 38 which is normally carried thereover in closing relationship and which, in the exemplary forms of the invention illustrated, is additionally provided with threaded locking means 40 for locking the cover 38 in said closed relationship. Removal of the cover 38 allows the interior chamber 22 to be refilled with the chlorine powder 24 when needed.

The hopper means 20 has a lower discharge opening means, generally indicated at 42, at the bottom thereof and defined between opposite side walls 44 of the hopper means 20, the front wall 46 thereof, and the downwardly forwardly angularly inclined bottom wall 48 thereof. Said four walls define said discharge opening means 42 in the shape of a rectangular bottom opening adapted to downwardly discharge the dry chlorine powder therethrough, under the action of gravity, into the underlying measuring container trough means, generally indicated at 50, until such time as further discharge of chlorine powder 24 through the discharge opening 42 is prevented by an accumulation of said chlorine powder 24 in the measuring container trough means 50 which acts to effectively block and close the discharge opening 42 by reason of the upward extension of the accumulated chlorine powder 24 into said discharge opening 42, as is most clearly shown at the bottom of FIG. 3.

A rear side portion of said measuring container trough means 50 is effectively provided with a dumping opening means, as generally indicated at 52, which is effectively provided with a rotatably mounted gate means, generally indicated at 54, positioned for closure of said dumping opening means 52 when the hopper means 20 is in the first or upright position thereof most clearly shown in FIG. 3 and also when the hopper is in the second or horizontal position thereof as most clearly shown in FIG. 6. Actually, said rotatively mounted gate means 54 is mounted on, and is operated by, the gate-operating means best shown in FIG. 7, which will be described hereinafter, in a manner such that the gate means 54 only opens when the hopper means 20 is in an intermediate position substantially half-way between the upright first position shown in FIG. 3 and the horizontal second position shown in FIG. 6, as is clearly shown in FIG. 7, wherein the gate means 54 is clearly shown in open relationship so that the measured quantity of dry chlorine powder 24 carried in the measuring container trough means 50 of FIG. 3 can be dumped downwardly through the dumping opening means 52 directly into the interior of the swimming pool at a location such as is indicated by the arrow 56 in FIG. 5. The detailed structure of said gate-operating means will be described hereinafter.

In the exemplary forms of the invention illustrated, the measuring container trough means 50 is adjustably mounted by vertically slidable mounting means generally designated at 57 and is provided with controllably operable locking means 58. This makes it possible to vertically slidably adjust the measuring container trough means 50 relative to the bottom of the hopper means 20 so as to vary the measured amount of powder 24 which will be discharged through the discharge opening means 42 into the measuring container trough means 50 each time the hopper means 20 returns to the first upright position best shown in FIG. 3.

In the exemplary form illustrated, said mounting means 57 takes the form of a pair of vertical slots 59 formed in the front wall 60 of the measuring container trough means 50 and slidably encompassing threaded screw means 62 which have their rear ends threadedly engaged with the front wall 46 of the hopper means 20 and which have their front wing portions 58 positioned outwardly of the slot means 59 for locking frictional engagement with the front wall 60 of the measuring container trough means 50 whereby to make it possible to lock it in any selected vertical position relative to the hopper means 20.

It should be noted that said front wall 60 of the measuring container trough means 50 and the adjacent portion of the front wall 46 of the hopper means 20 are provided with indicating scale means 66 and cooperating pointer means 68, respectively, for visibly indicating a desired measured amount of the chlorine powder 24 which will be dispensed during each dispensing operation. This is facilitated by having the front wall 60 of the measuring container trough means 50 transparent so that the entire indicating scale means 66 can be read.

The entire hopper means 20 is adapted to be actuated between the first upright position best shown in FIG. 3 and the second horizontal position best shown in FIG. 6, and back again, by actuator means, one form of which is generally designated at 70 and which, in the exemplary first version of the invention illustrated, takes the form of a linear-motion, hydraulic pressure-operated, cylinder type of actuator means rotatably connected at one end, as indicated at 72, to the inclined bottom wall 48 of the hopper means 20 at a location downwardly offset from the previously-mentioned first axis of rotation comprising the axis of the stub shafts 28 mounting the hopper means 20, and with said actuator means 70 being rotatively connected at the other or opposite end, as indicated at 74, to a clevis or yoke structure 76 which is fixedly connected to the bottom wall 78 of the supporting framework means 26, as is best shown in FIGS. 3 and 6.

The actuator means 70 is provided with a high-pressure input duct means 80 adapted for connection to a high-pressure hydraulic line 82 which, as shown in FIG. 8, is pressurized by the main swimming pool pump 84 when it is running, thus providing an arrangement such that the actuator 70 will be actuated and will extend the connecting rod 86 in the manner best shown in FIG. 6 whenever the swimming pool pump 84 is running so that the hopper means 20 will be caused to assume the second or horizontal position shown in FIGS. 5 and 6 and to remain in said position as long as the swimming pool pump 84 is running. Whenever the swimming pool pump 84 is de-activated, such as is customarily done under the control of a clock-operated electrical energizing and de-energizing switch for the motor of the pump 84, which, in such cases, is of the electrical type, the de-activation of the pump 84 results in a drop in pressure in the hydraulic line 82 and a drop in input pressure to the actuator 70, which then is effectively actuated in the opposite direction so as to effectively retract the connecting rod 86 into the retracted position best shown in FIG. 3, which correspondingly rotates the hopper means 20 into the previously-mentioned first or upright position best shown in FIG. 3. Said retractive movement or operation of the actuator means 70 may occur primarily as a result of gravitational action if the hopper 20 is so shaped that the center of gravity thereof lies to the left of the aligned stub shafts 28 and, if such is not the case, an optional spring, such as that shown in phantom at 88 in FIGS. 3 and 6, may be positioned forwardly of the phantom line piston 90 of the actuator means 70 and this will act to effectively actuate or operate the actuator means 70 into the retracted relationship shown in FIG. 3 when the input pressure into the input duct 80 drops below a predetermined value as a result of de-energization of the motor of the main swimming pool pump 84. Incidentally, it should be noted that the motor and time clock-controlled electrical energizing and de-energizing switch means for said motor of said main swimming pool pump are not independently illustrated in detail and are merely lumped in the part designated at 84. This is done because such arrangements are well-known in the art and do not touch upon the real inventive concept of the present invention.

The gate means 54 previously referred to is effectively operated by gate-opening or gate-operating lever means 92 pivotally connected by pivot shaft means 94 to mounting tabs 95 fixedly carried at the rear of the previously mentioned inclined bottom wall 48 of the hopper means 20, with a forward end of each of the two lever means 92 being rigidly connected to the gate means 54 and with an intermediate portion of each of the lever means 92 being provided adjacent to the mounting shaft 94 thereof with abutment or follower means taking the form of a wheel or roller 96 centrally pivotally attached to said intermediate portion of the corresponding lever means 92.

It should be noted that the entire hopper 22, including the measuring container trough means 50 at the bottom thereof and each of the two just-described gate-operating lever means 92, pivots around the horizontal axis of the two previously, mentioned aligned stub shafts 28, thus causing the abutment wheel 96 to move in an arc, when the actuator 70 is extended, from the position of said wheel 96 shown in FIG. 3, toward the intermediate position shown in FIG. 7 where said abutment follower wheel 96 strikes a corresponding operating pin means 98 carried inside of each of the side wall portions 32 of the upstanding framework means 26 in the rotative path of travel of said abutment roller 96 of the corresponding lever means 92 for causing pivotal movement of each of said lever means 92 around its mounting shaft 94 relative to the mounting tab 95 carried by the bottom wall 48 of the hopper means 20. This rotative movement of the lever means effectively swings the gate means 54 downwardly into the fully-open vertical position shown in FIG. 7 wherein it is substantially displaced from the previously mentioned dumping opening means 52 of the measuring container trough means 50 so that the measured quantity of chlorine powder 24 (not shown in FIG. 7) can be dispensed therefrom directly downwardly into the interior of the underlying swimming pool.

The rear end of each of the lever means 92 is provided with biasing weight means 100 which operates to effectively bias each of said lever means 92, and the gate means 54 attached thereto, into a normally closed relationship with respect to the dumping opening means 52. While the biasing means is shown, in the exemplary forms of the invention, as comprising the biasing weights 100, it should be noted that said biasing means may be modified to comprise spring means in certain forms of the invention.

The front face of the gate means 54 is provided with a compressible (and usually elastomeric) sealing gasket face member 102 adapted to provide a very effective sealing engagement with the bottom wall 104 and the two side walls 106 of the measuring container trough means 50.

It should be noted that the main swimming pool water return line 108 from the high-pressure side of the filter 110 (of course, pressurized from the high-pressure side of the previously-mentioned pump and motor 84) may comprise an under-the-surface conduit into the interior of the swimming pool generally designated at 111, and it by-passes the previously-mentioned high-pressure duct 82 which is connected to the input duct 80 of the actuator 70 of the complete dry chlorine powder dispenser generally designated at 112 in FIG. 8.

However, various other connection arrangements may be employed within the broad scope of the present invention.

FIGS. 9 and 10 illustrate a very slight modification of the invention wherein an additional solution container means, generally designated at 114, is adapted to be mounted in the position indicated in phantom at 114 in FIG. 6 so that it underlies the dumping opening means 52 of the measuring container trough means 50 when it reaches a fully gate-open dumping position such as that previously described and illustrated in FIG. 7. Thus, the measured dispensed quantity of dry chlorine powder will drop into the upwardly open solution container means 114 and into the quantity of water 116 carried therein and will be dissolved in said water 116 to produce a very concentrated chlorine solution which can then be fed, under the action of gravity, through the outflow duct means 118 to the larger body of water contained within a swimming pool, in the manner shown in solid lines in FIG. 10, wherein said outflow duct means extends along the top surface of the deck 120 surrounding the swimming pool opening 111, or said outflow duct means may optionally extend underground in the manner indicated in broken lines at 118 in FIG. 10 into the opening 111 of the swimming pool, as is also shown in FIG. 10. These may be optional feed-in arrangements for connection of the solution container means 114 to the interior 111 of the swimming pool.

In the case of the upper alternate arrangement wherein the outflow tube means 118 extends across the deck surface 120 to the swimming pool interior 111, it may merely comprise a flexible plastic tube, or the like, and, thus, may provide a very simple and economical arrangement.

It should be noted that in the modified form of the invention where the outflow through the outflow duct means 118 is gravity-caused, the entire chlorinator 112 may be provided with mounting means 122 for mounting the chlorinator 112 at an elevated location on a fence, such as that indicated at 124, which usually surrounds the filter and pump structure shown at 110 and 84 for the purposes of concealment. The elevation of the dispenser 112 should be 2½ to 3 feet at least, above the surface of the swimming pool water so as to cause a proper gravity feeding of the concentrated chlorine solution 116. The level of the concentrated chlorine solution 116 in the solution container 114 may be maintained by providing a controlled inflow of water thereinto by way of an inflow duct means 126 and an inflow-controlling float valve means, such as is generally indicated at 128 in FIG. 9, which is operated by a float 130.

It should be noted that the entire chlorine dispenser 112 may be provided with suitable mounting means for appropriately mounting same. In the case of the first form of the invention, this may comprise threaded fastener means 132 which may firmly fasten the bottom wall 78 of the framework means 26 to the deck 120 surrounding the swimming pool. In the second form illustrated in FIGS. 9 and 10, various forms of mounting means may be employed such as the mounting ears and threaded fastening means indicated at 122. However, various other suitable mounting means may be employed in lieu of the structures just described.

It should be noted that during the rotative movement of the hopper means 20 from the first or upright position, best shown in FIG. 3, into the second or horizontal position, best shown in FIG. 6, the gate means 54 remains closed as long as the hopper bottom wall portion 48 is inclined downwardly toward the discharge opening means 42 and does not actually begin to open until after said bottom wall 48 of the hopper means 20 has reached a horizontal position and has begun to move from said horizontal position into a position such that the discharge opening means 42 is higher than the major portion of said bottom wall 48 which slopes downwardly and away from said discharge opening means 42. When the gate means 54 is fully open, said bottom wall 48 of the hopper is very definitely downwardly inclined and toward the right as shown at 48 in FIG. 7. Conversely, when the hopper means 20 moves from the second or horizontal position, best shown in FIG. 6, toward the first or upright position, best shown in FIG. 3, the momentary opening of the gate means 54 occurs while said bottom wall 48 is inclined in the manner shown in FIG. 7, so that there will be no gravity discharge or dumping of chlorine powder through the discharge opening means 42 or the dumping opening means 52. Immediately thereafter, the gate means 54 will close, before the bottom wall 48 of the hopper means 20 passes through the horizontal position thereof and begins to assume a leftwardly downwardly inclined position. This is an important feature since it prevents any undesired dispensing of the chlorine powder 24 of FIG. 3 during the return movement of the hopper means 20 to the normal upright position best shown in FIG. 3.

It should be noted that, in certain forms of the invention wherein the particulate material, such as the chlorine powder shown at 24 in the illustrated form of the invention, is of a relatively non-clogging type or where, for other reasons, it is not believed that the gate means 54 is necessary, it may be eliminated entirely, in which case the gate-opening or gate-operating means comprising the two lever members 92, the two abutment roller members 96, and the two biasing weight members 100 may be eliminated completely, in addition to the two lever-operating pin means 98. In such a modified form of the invention, with said parts removed or eliminated, it will be noted that the dispensing operation is substantially the same as that described hereinbefore, with the exception of the gate-opening operation, and still comprises a two-step operation including the measuring discharge of particulate material into the measuring container trough means 50 when the hopper means 20 is in the upright position and the subsequent dumping of said measured quantity of the particulate material when the rear dumping opening 52 is rearwardly inclined in the manner shown in FIG. 7. Otherwise, this modified form of the invention operates in a manner similar to that of the first form of the invention.

It should be noted that in either of the forms of the invention illustrated, the complete dispenser means may be effectively disguised, if desired, by covering the exterior thereof with any suitable material, structure, or the like, having a desired appearance. For example, an artificial figure simulating an animal, a person, or any other desired object, and preferably made of plastic, or the like, may completely cover the entire dispenser. However, it should be noted that such disguising exterior structure means may assume a great variety of different forms for the purposes just outlined above and may be either a separate structure means adapted to effectively cover the dispenser or may be actually attached to or comprise a part of the dispenser means and may be provided with access means into the interior thereof. However, it should be noted that the invention is not specifically limited to the use of a disguising exterior structure means or to any particular form or version thereof when so used.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A measured quantity intermittent-action dispenser for flowable material, comprising: supply hopper means having a hollow interior chamber defined therein adapted to contain therein a quantity of a flowable material which is to be intermittently dispensed in measured quantities; supporting framework means rotatably mounting said hopper means for rotation about a substantially horizontal axis of rotation between a first substantially vertically directed position and a second substantially horizontally directed position angularly displaced from each other around said axis of rotation; said hopper means having a lower discharge means at the bottom thereof provided with an underlying measuring container trough means positioned to receive a measured quantity of flowable material discharged under the action of gravity downwardly through said discharge opening means thereinto, a rear portion of said container trough means being provided with dumping opening means, said dumping opening means including rotatably mounted gate means positioned for closure of said dumping opening means when said hopper means is in said first upright position thereof, and positioned for opening of said dumping opening means when said hopper means is moved through intermediate position between said first and second rotatably displaced positions whereby to dump the measured quantity of flowable material from said container trough means under the action of gravity through said dumping opening means into a desired receiving region; linear fluid-pressure-operated actuator means rotatably connected at one end to said hopper means at a location offset from said substantially horizontal axis of rotation of said hopper means and rotatably connected at the other end to a fixed mounting location relative to said supporting framework means and being provided with a high-pressure input duct means adapted for connection to a source of fluid under pressure adapted to be maintained below a predetermined pressure valve when the actuator is to be in unactuated condition and adapted to be maintained above a predetermined pressure when the actuator means is to be in fully actuated condition; and including gate-operating lever means connected to said gate means, and lever-operating means carried by said upstanding framework means in the rotative path of travel of said lever means for moving said lever means, and said gate means connected thereto, into gate-open relationship in response to abutment of said lever means and said lever-operating means.

2. Apparatus as defined in claim 1, including biasing means cooperable with said lever means for normally biasing same in a direction such as to close said gate means relative to said dumping opening means.

3. Apparatus as defined in claim 1, including biasing weight means cooperable with said lever means for normally biasing same in a direction such as to close said gate means relative to said dumping opening means.

4. Apparatus as defined in claim 1, including movable mounting means adjustably mounting said container trough means relative to said hopper means for correspondingly modifying the measured quantity of flowable material adapted to be dispersed and dumped therefrom during a dispensing and dumping operation.

5. Apparatus as defined in claim 1, including movable mounting means adjustably mounting said container trough means relative to said hopper means for correspondingly modifying the measured quantity of flowable material adapted to be dispensed and dumped therefrom during a dispensing and dumping operation, and indicating scale means and cooperating marker means carried by said relatively movable container trough means and hopper means for visibly indicating a desired measured amount of flowable material which will be dispensed from said hopper means through said discharge opening means into said container trough means.

6. Apparatus as defined in claim 1, including vertically slidable mounting means and controllably operable locking means vertically adjustably mounting said container trough means relative to said hopper means for correspondingly modifying the measured quantity of flowable material adapted to be dispensed and dumped therefrom during a dispensing and dumping operation.

7. Apparatus as defined in claim 1, including vertically slidable mounting means and controllably operable locking means vertically adjustably mounting said container trough means relative to said hopper means for correspondingly modifying the measured quantity of flowable material adapted to be dispensed and dumped therefrom during a dispensing and dumping operation, and indicating scale means and cooperating marker means carried by said relatively movable container trough means and hopper means for visibly indicating a desired measured amount of flowable material which will be dispensed from said hopper means through said discharge opening means into said container trough means.

8. Apparatus as defined in claim 1, wherein said hopper means is provided with a filling opening and removable cover means normally carried thereover in closing relationship provided with locking means for locking said cover means in said closed relationship.

9. Apparatus as defined in claim 1, including a solution container means positioned in said receiving region for the reception of said measured dumped quantity of said flowable material and adapted to contain a quantity of solvent liquid therein for dissolving said flowable material whereby to produce a concentrated solution thereof adapted to be subsequently dispensed into a larger body of water.

10. Apparatus as defined in claim 1, including a solution container means positioned in said receiving region for the reception of said measured dumped quantity of said flowable material and adapted to contain a quantity of solvent liquid therein for dissolving said flowable material whereby to produce a concentrated solution thereof adapted to be subsequently dispensed into a larger body of water, said solution container means being provided with water inflow duct means, provided with inflow-controlling float valve means, and said solution container means being provided with gravity-type outflow duct means for gravity-caused outflow of said concentrated solution therefrom to the larger body of water.

11. Apparatus as defined in claim 1, including a solution container means positioned in said receiving region for the reception of said measured dumped quantity of said flowable material and adapted to contain a quantity of solvent liquid therein for dissolving said flowable material whereby to produce a concentrated solution thereof adapted to be subsequently dispensed into a larger body of water, said solution container means being provided with water inflow duct means, provided with inflow-controlling float valve means, and said solution container means being provided with gravity-type outflow duct means for gravity-caused outflow of said concentrated solution therefrom to the larger body of water; said outflow duct means comprising a flexible duct adapted to extend along the top surface of a deck surrounding a swimming pool and to depend over an edge thereof into discharging relationship with respect to an interior portion of a swimming pool.

12. A dispenser for flowable material comprising: a rotatable supply hopper mounted on a support and adapted for intermittent rotation between a substantially vertical position and to prevent the flow of material from a discharge opening in said hopper; a measuring trough connected to said hopper adapted to receive flowable material through said discharge opening; means to permit the flow of material from said hopper through said discharge opening when said hopper is in a substantailly vertical position and to prevent the flow of material from said hopper through said discharge opening when said hopper is in a predetermined intermediate position between said substantially horizontal position and said substantially vertical position, said means also preventing the flow of material from said hopper through said discharge opening when said hopper is in a substantially horizontal position and at positions between said intermediate position and said substantially horizontal position; a gate connected with said measuring trough; means to bias said gate to a closed position, and gate opening means adapted to open said gate to discharge flowable material from said measuring trough when said hopper is rotated from said substantially vertical position where said means prevents the flow of material from said hopper through said discharge opening.

13. The dispenser of claim 12, including movable mounting means for varying the volume of said measuring trough.

14. The dispenser of claim 12 including a solution container means positioned to receive flowable material from said gate, and adapted to contain a quantity of solvent liquid therein for dissolving said flowable material whereby to produce a concentrated solution thereof adapted to be subsequently dispensed into a large body of water.

15. The dispenser of claim 12, including pressure operated actuating means for intermittently rotating said hopper between a substantially vertical and a substantially horizontal position.

16. The dispenser of claim 12, wherein the interior surface of said hopper adjacent said discharge opening slopes upwardly toward said discharge opening when said hopper is in a substantially horizontal position.

17. The dispenser of claim 16, wherein said interior surface of said hopper adjacent said discharge opening terminates in a lip which forms a portion of said discharge opening and extends over a portion of said measuring trough.

References Cited

UNITED STATES PATENTS

| | | | |
|---|---|---|---|
| 370,004 | 9/1887 | Bruner | 222—166 |
| 729,623 | 6/1903 | Marsh | 222—166 |
| 782,325 | 2/1905 | Cobb | 222—47 |
| 1,660,284 | 2/1928 | Waters | 222—457 |
| 1,969,091 | 8/1934 | Miles | 222—438 |
| 2,507,362 | 5/1950 | Wilhelm | 222—457 |
| 2,755,001 | 7/1956 | Doepke et al. | 222—457 |
| 2,952,392 | 9/1960 | Matter | 222—437 |
| 3,211,344 | 10/1965 | Ekman et al. | 222—166 |

WALTER SOBIN, *Primary Examiner.*

UNITED STATES PATENT OFFICE
CERTIFICATE OF CORRECTION

Patent No. 3,351,237                        November 7, 1967

Robert Ortega

It is hereby certified that error appears in the above numbered patent requiring correction and that the said Letters Patent should read as corrected below.

Column 10, line 45, strike out "to prevent the flow of material from" and insert instead -- a substantially horizontal position; --.

Signed and sealed this 18th day of March 1969.

(SEAL)

Attest:

Edward M. Fletcher, Jr.                      EDWARD J. BRENNER

Attesting Officer                                Commissioner of Patents